US012215982B2

(12) United States Patent
Pydin et al.

(10) Patent No.: US 12,215,982 B2
(45) Date of Patent: Feb. 4, 2025

(54) ROUTE GENERATION DEVICE FOR AUTONOMOUS MOBILE BODY

(71) Applicant: HONDA MOTOR CO., LTD., Tokyo (JP)

(72) Inventors: Andrii Pydin, Saitama (JP); Wei Song, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 17/936,863

(22) Filed: Sep. 30, 2022

(65) Prior Publication Data

US 2024/0110797 A1 Apr. 4, 2024

(51) Int. Cl.
*G01C 21/00* (2006.01)
*G01C 21/34* (2006.01)

(52) U.S. Cl.
CPC ....... *G01C 21/343* (2013.01); *G01C 21/3453* (2013.01)

(58) Field of Classification Search
CPC ... G01C 21/343; G01C 21/3453; G01C 21/00
USPC .......................................................... 701/25
See application file for complete search history.

(56) References Cited

U.S. PATENT DOCUMENTS

| 2020/0394922 | A1 | 12/2020 | Gardner et al. | |
| 2022/0120569 | A1* | 4/2022 | Gerrese | G01C 21/3461 |
| 2022/0355823 | A1* | 11/2022 | Tagawa | B60W 60/0015 |

FOREIGN PATENT DOCUMENTS

JP 2022111121 A 7/2022

OTHER PUBLICATIONS

Coltin, Brian. Multi-Agent Pickup And Delivery Planning With Transfers. 2014. Doktorarbeit, S. i-xiv, 1-16, 133-142 Carnegie Mellon University, USA.
Office Action issued Aug. 6, 2024 in the DE Patent Application No. 102023126423.0.

* cited by examiner

*Primary Examiner* — Shardul D Patel
(74) *Attorney, Agent, or Firm* — CKC & Partners Co., LLC

(57) ABSTRACT

The route generation device includes a controller configured to generate, in response to acceptance of an allowable arrival time period assigned to at least one of the plurality of destinations, an input of information regarding specifics of a task to be performed at the at least one destination, and setting of a required time period according to the specifics of the task, a route that allows the autonomous mobile body to arrive at the at least one destination within the allowable arrival time period, based on the required time period. The controller is configured to control and cause the autonomous mobile body to travel along the generated route.

8 Claims, 6 Drawing Sheets

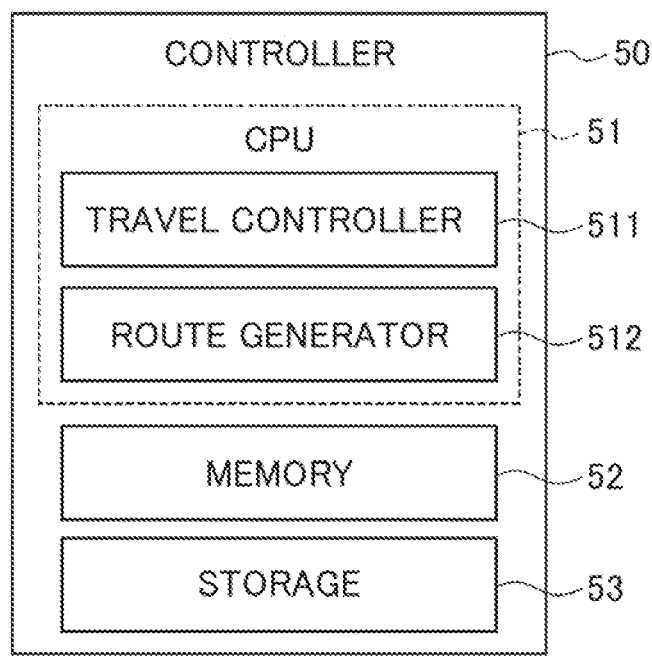
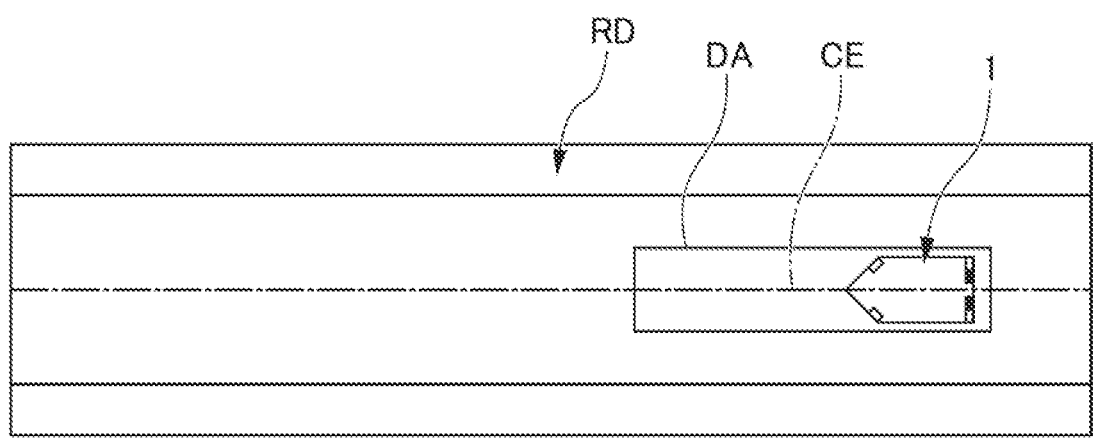

Allowable if 07:00 ≤ $p_i$ ≤ 10:00 is satisfied $p_i$: Task start hour at node $i$
$e_i$ $l_i$: Allowable task start hour at node $i$ $p_i$: Task start hour at node $i$
$T_{(wait,i)}$: Waiting time (loading time, unloading time) at node $i$

ROUTE GENERATION DEVICE FOR AUTONOMOUS MOBILE BODY

BACKGROUND OF THE INVENTION

Field of the Invention

The present invention relates to a route generation device for an autonomous mobile body.

Related Art

There is a known automatic traveling system for a vehicle capable of both autonomous traveling and manual traveling (see, for example, Japanese Unexamined Patent Application, Publication No. 2022-111121). Such an automatic traveling system causes a vehicle to autonomously travel along a preset route based on position information.

Patent Document 1: Japanese Unexamined Patent Application, Publication No. 2022-111121

SUMMARY OF THE INVENTION

In a limited outdoor area including a semi-outdoor area, such as a construction site, a vehicle capable of autonomously traveling is needed to transport a load from one location to another location. In this case, since unloading or the like at the other location is allowed within a limited scheduled period, it is required that the vehicle arrive at the other location within the limited scheduled period.

An object of the present invention is to provide a route generation device adapted for an autonomous mobile body, and capable of causing the autonomous mobile body to arrive at a predetermined location and to perform a predetermined task within a limited scheduled period, thereby contributing to improvement of safety.

To achieve the above object, an aspect of the present invention provides a route generation device for an autonomous mobile body (e.g., an autonomous mobile body 1 to be described later) capable of autonomously moving to a plurality of destinations. The route generation device includes: a controller (e.g. a controller 50 to be described later) configured to generate, in response to acceptance of an allowable arrival time period assigned to at least one of the plurality of destinations, an input of information regarding specifics of a task to be performed at the at least one destination, and setting of a required time period according to the specifics of the task, a route that allows the autonomous mobile body to arrive at the at least one destination within the allowable arrival time period, based on the required time period. The controller is configured to control and cause the autonomous mobile body to travel along the generated route.

In this case, it is preferable that a plurality of the allowable arrival time periods are able to be assigned to one of the plurality of destinations, and the controller generates a route such that one of the plurality of the allowable arrival time periods is satisfied. In this case, it is preferable that the required time period is set for each type of task. In this case, it is preferable that the required time period is set to a value obtained by multiplying at least one of a type or a number of a load to be loaded on the autonomous mobile body.

In this case, it is preferable that a plurality of the tasks with different specifics are assigned to one of the plurality of destinations, and the controller generates a route such that the required time periods do not overlap with each other at the one of the plurality of destinations. In this case, it is preferable that the controller generates a route such that a maximum possible quantity of tasks with different specifics assigned to the plurality of destinations are performed. In this case, it is preferable that the controller generates a route such that a small number of loads are loaded on the autonomous mobile body. In this case, it is preferable that the controller generates a route such that a plurality of the autonomous mobile bodies share the task.

The present invention provides a route generation device adapted for an autonomous mobile body, and capable of causing the autonomous mobile body to arrive at a predetermined location within a limited scheduled period and to perform a predetermined task, thereby contributing to improvement of safety.

BRIEF DESCRIPTION OF THE DRAWINGS

FIG. 2 is a block diagram illustrating a controller forming part of a route generation device for an autonomous mobile body according to an embodiment of the present invention;

FIG. 3 is a diagram illustrating a detection range within which an obstacle can be detected by an autonomous mobile body according to an embodiment of the present invention;

DETAILED DESCRIPTION OF THE INVENTION

Embodiments of the present invention will be described below in detail with reference to the accompanying drawings. An autonomous mobile body 1 according to the present embodiment is a vehicle configured as an unmanned cart or the like provided with, for example, a load platform. The autonomous mobile body 1 autonomously travels along a road without a driver aboard, in a limited outdoor work area including a semi-outdoor area, such as a construction site, and transports a load from one location to another location. In a case where an obstacle OB or the like is present on a travel route where the autonomous mobile body 1 is traveling, the autonomous mobile body 1 detects by itself the obstacle OB or the like, generates and updates therein a cost map regarding a route along which the autonomous mobile body 1 is to travel, instead of resorting to guide by means of communication with an external device, and thereby travels while avoiding the obstacle OB.

Figure 1:
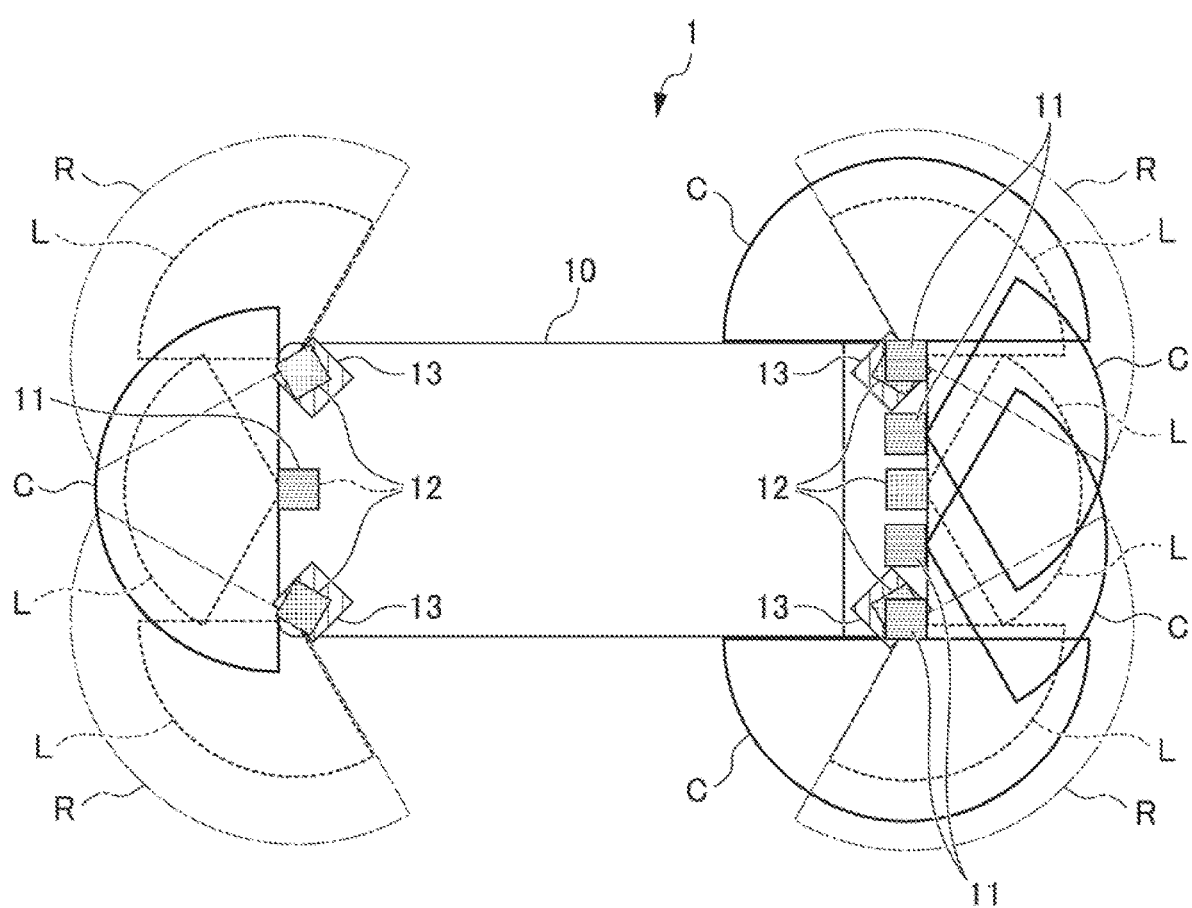
FIG. 1 is a diagram illustrating an autonomous mobile body according to an embodiment of the present invention.

As illustrated in FIGS. 1 and 2, the autonomous mobile body 1 includes a vehicle body 10 having a rectangular shape in plan view, a controller 50 provided to the vehicle body 10, an input unit (not shown) such as a touch panel electrically connected to the controller 50, and a communication device (not shown) electrically connected to the controller 50 and capable of transmitting and receiving information to and from another autonomous mobile body 1. The information exchanged between the autonomous mobile bodies 1 is related to, for example, an allowable arrival time period set for each location, tasks with different specifics (e.g., loading, unloading, etc.) to be performed at each location, a required time period according to the specifics of each task, and a task start hour of each task. In FIG. 1, a front end portion and a rear end portion of the vehicle body 10 are depicted as the right end portion and the left end portion, respectively. The front end portion and the rear end portion of the vehicle body 10 are both provided with cameras 11, LIDARs (Light Detection and Ranging) 12, and radars 13 that function as outside recognition devices for detecting and recognizing an outside of the vehicle body 10. The vehicle body 10 further includes a GPS device (not shown).

The vehicle body 10 includes, for example, a frame that forms a skeleton of the autonomous mobile body 1, and an outer jacket that covers a space defined by the frame.

A travel unit has a function of causing the autonomous mobile body 1 to travel according to a cost map regarding a route that is generated and updated by a route generator 512 to be described later. The travel unit is mounted to the vehicle body 10, and includes wheels (not shown) and a motor (not shown). The wheels are rotatably supported on the right and left ends of front and rear portions of the autonomous mobile body 1 and include drive wheels and driven wheels. The motor drives the drive wheels.

The cameras 11 include two cameras 11 installed at the right and left ends of the front portion, two cameras 11 installed at positions near the center of the front portion of the vehicle body 10 (i.e., four cameras 11 in total at the front portion), and one camera 11 installed at the center of the rear portion of the vehicle body 10, and detect an obstacle OB present in directions C shown in FIG. 1.

The LIDARs 12 include LIDARs 12 each installed at the right and left ends and the center of the front portion of the vehicle body 10 (i.e., three LIDARs 12 in total at the front portion), and LIDARs 12 each installed at the right and left ends and the center of the rear portion of the vehicle body 10 (i.e., three LIDARs 12 in total at the rear portion), and detect an obstacle OB present in directions L shown in FIG. 1.

The radars 13 include radars 13 each installed at the right and left ends of the front portion of the vehicle body 10 (i.e., two radars 13 in total at the front portion), and radars 13 each installed at the right and left ends of the rear portion of the vehicle body 10 (i.e., two radars 13 in total at the rear portion), and detect an obstacle OB present in directions R shown in FIG. 1. The cameras 11, the LIDARs 12, and the radars 13 are electrically connected to the controller 50, and output, upon detecting the obstacle OB, a detection signal to the controller 50.

As illustrated in FIG. 2, the controller 50 is an electronic control unit (ECU) including a central processing unit (CPU) 51, a memory 52, and a storage 53. The CPU 51 controls various components of the autonomous mobile body 1 by developing a program, which is stored in the storage 53, in the memory 52 and executing the program. The functions of the controller 50 may be implemented by a semiconductor integrated circuit such as a programmable logic device (PLD) or an application specific integrated circuit (ASIC), or may be implemented by software. In other words, the functions of the controller 50 can be implemented by either hardware or software.

The CPU 51 functions as a travel controller 511 and a route generator 512. For example, when functioning as the route generator 512, the CPU 51 generates and updates a cost map regarding a route along which the autonomous mobile body 1 is to travel, based on information regarding an obstacle OB or the like detected by the cameras 11, the LIDARs 12, and the radars 13. Further, the CPU 51 functions as the travel controller 511 to control the travel unit, and thereby causes the autonomous mobile body 1 to travel according to the generated and updated cost map regarding the route. Thus, a function of autonomously traveling along a road without a driver aboard while avoiding an obstacle OB, and transporting a load from one location to another location is achieved in a work area.

Figure 5:
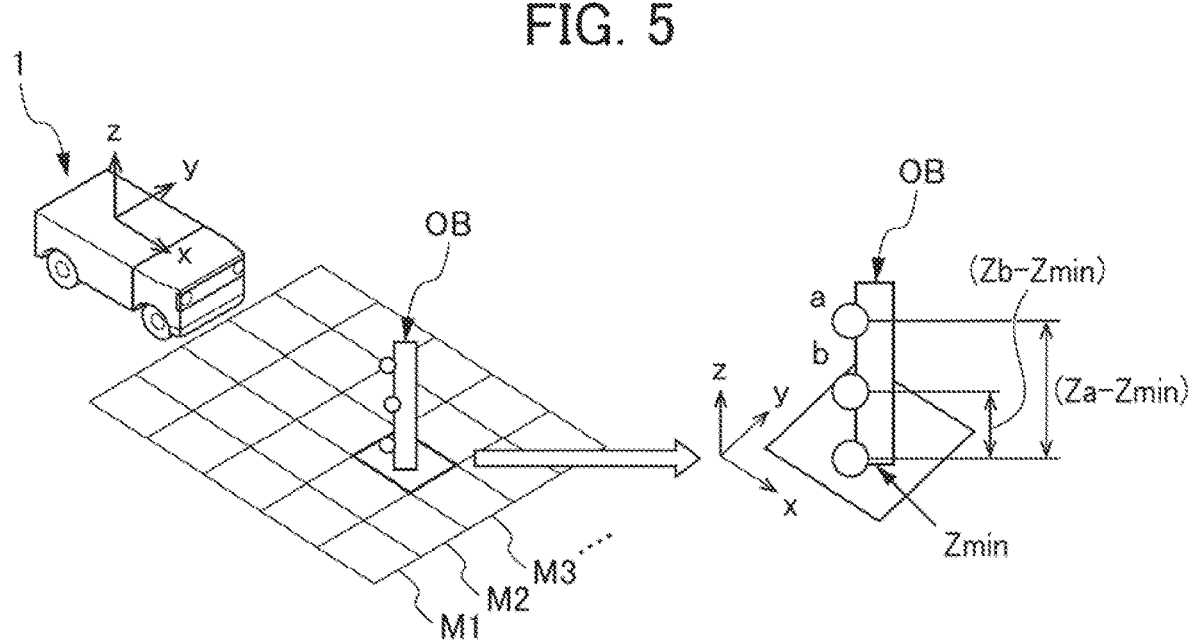
FIG. 5 is a diagram illustrating a manner in which an autonomous mobile body according to an embodiment of the present invention determines an obstacle.

The storage 53 stores in advance a map of a route in the work area and a cost map corresponding to the map. As illustrated in FIG. 3, the map includes a road RD in which a broken line CE is written at the center of a lane for the autonomous mobile body 1 to travel. When the position of the autonomous mobile body 1 is specified by the GPS device (not shown), and the obstacle OB is not detected on the route, the travel controller 511 controls the travel unit so as to cause the autonomous mobile body 1 to travel on the line CE indicated by the broken line along the route in the map. As illustrated in, for example, FIG. 5, the cost map corresponding to the map includes a plurality of square grid cells M1 to M9 which are arranged in a grid pattern and into which the cost map is divided. The cost map is stored in the storage 53. In FIG. 3, in order to indicate the traveling direction of the autonomous mobile body 1, the autonomous mobile body 1 is depicted as a pentagon, which corresponds to the original rectangular shape whose short side ahead in the traveling direction is deformed to protrude.

Figure 4:
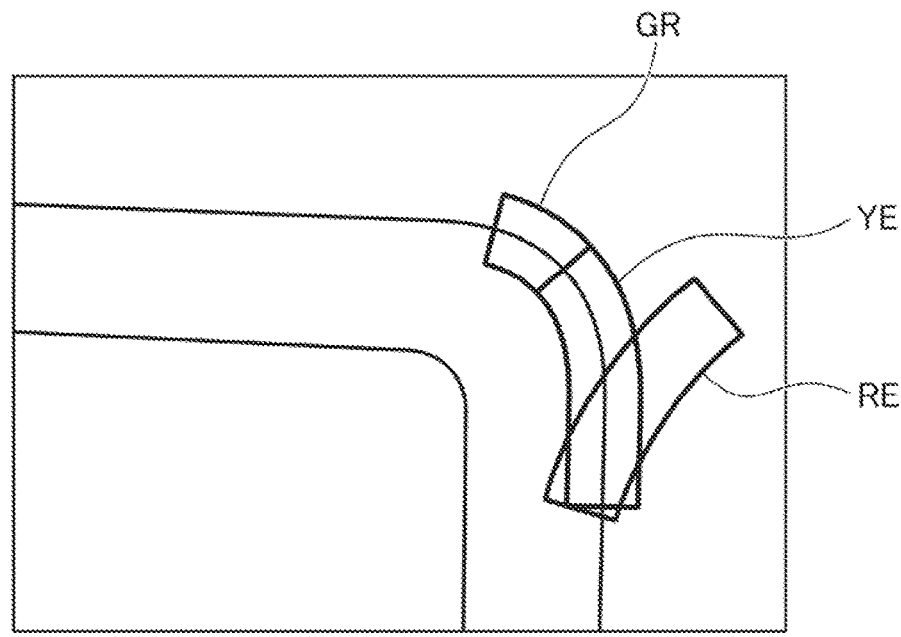
FIG. 4 is a diagram illustrating a plurality of detection ranges within which an obstacle can be detected by an autonomous mobile body according to an embodiment of the present invention.

Next, detection of an obstacle OB by controller 50 will be described. As illustrated FIG. 3, the autonomous mobile body 1 detects an obstacle OB within a detection range DA that is a region along the line CE in the map. In a case where no obstacle OB is present on the route along which the autonomous mobile body 1 travels, an operation for detecting an obstacle OB is performed while a long-distance detection range GR show in FIG. 4 is set as at detection range DA. The long-distance detection range GR extends along the line CE and is a range where the detection operation is performed up to a far position in front of the autonomous mobile body 1. In a case where an obstacle OB is detected to be present in the long-distance detection range GR, an operation for detecting the obstacle OB is performed while a short-distance detection range YE is set as the detection range DA. The short-distance detection range YE extends along the line CE and is a range where the detection operation is performed up to a relatively close position in front of the autonomous mobile body 1.

At the same time as the operation for detecting the obstacle OB in the long-distance detection range GR or the short-distance detection range YE, an operation for detecting the obstacle OB is performed while a short-distance detection range RE is set as the detection range DA. The short-distance detection range RE extends in a direction in which the autonomous mobile body 1 is oriented and is a range where the detection operation is performed up to a relatively close position in front of the autonomous mobile body 1. The short-distance detection range RE is set as the detection range DA in order to urgently stop the autonomous mobile body 1 when a dynamic obstacle OB suddenly appears immediately in front of the autonomous mobile body 1.

In other words, the long-distance detection range GR and the short-distance detection range YE both have the line CE at the center thereof, whereas the short-distance detection range RE is able to be directed in a direction departing from the line CE but along a direction in which the autonomous mobile body 1 is oriented. In the detection range DA described above, the obstacle OB is detected which occupies one or some of the grid cells M1 to M9 of the cost map to be described later. In each of these detection ranges, the detection operation is performed using the cameras 11, the LIDARs 12, and the radars 13.

When it is detected that one or some of the grid cells M1 to M9 of the cost map are occupied, the controller 50 determines whether or not the occupying object is an obstacle OB in the following manner. When any of the long-distance detection range GR, the short-distance detection range YE, and the short-distance detection range RE shown in FIG. 4 comes to contain any of the occupied grid cells M1 to M9 during traveling of the autonomous mobile body 1, the controller 50 first calculates, for a plurality of upper portions (Za, Zb, etc.) of the occupying object, positional differences from the lowest end portion (Zmin) of the occupying object. If an average value of the positional differences exceeds a predetermined threshold value, the controller 50 determines the occupying object to be an obstacle OB.

Next, generation of a route for the autonomous mobile body 1 by the route generator 512 of the controller 50 will be described. In the following, a case will be described in which a plurality of autonomous mobile bodies 1 each configured to transport a load from one location to a plurality of other locations perform their tasks at the same time.

Figure 6:
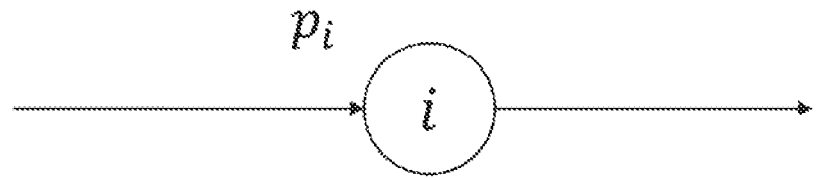
FIG. 6 is a diagram illustrating a time window indicating a scheduled period within which a route generation device for an autonomous mobile body according to an embodiment of the present invention can perform a task at a predetermined location.
Figure 7:
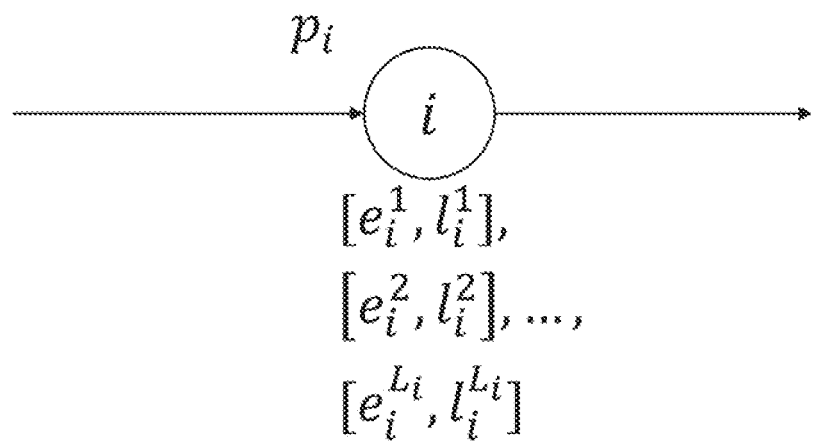
FIG. 7 is a diagram illustrating a plurality of time windows indicating scheduled periods within which a route generation device for an autonomous mobile body according to an embodiment of the present invention can perform tasks at a predetermined location.
Figure 8:
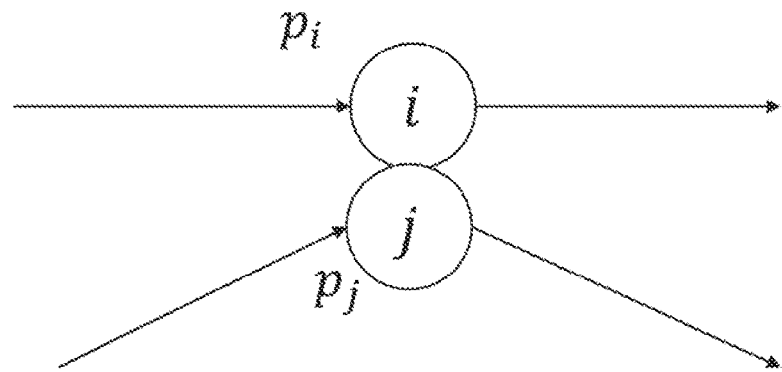
FIG. 8 is a diagram corresponding to a case where two autonomous mobile bodies perform tasks at a predetermined location, and illustrates a task start hour and a standby time period for the autonomous mobile body during the task, as determined by a route generation device for an autonomous mobile body according to an embodiment of the present invention.

First, an allowable arrival time period (time window) for each location is input and assigned via the input unit (not shown) such as a touch panel. Specifically, as illustrated in FIG. 6, in a case where a first allowable arrival time period within which an i-th autonomous mobile body 1 is to arrive at a predetermined location is from 7:00 to 10:00, a start hour $e^1_i$ and an end hour $l^1_i$ of the allowable arrival time period are set to 7:00 and 10:00, respectively, by means of the input unit (not shown). When two or more allowable arrival time periods can be assigned, $e^1_i, e^2_i, \ldots, e^{L1}_i$, and $l^1_i, l^2_i, \ldots,$ and $l^{Li}_i$ are respectively input and set, as illustrated in FIG. 7, Furthermore, information regarding the tasks with different specifics (e.g., loading, unloading, etc.) to be performed at the locations, a start hour for each type of task, etc. is input, and a required time period is also input for each type of task or according to the specifics of the task. Specifically, as illustrated in FIG. 8, the task start hour pi, the required time period T(wait,i), and the like are input and set for the i-th autonomous mobile body 1. In a case where the task is unloading, the required time period T(wait,i) is set to a value obtained by multiplying at least one of the number of type of loads or the number of loads to be loaded on the autonomous mobile body 1 by a time period required for one load of a single type.

Based on the required time period T(wait,i) calculated as described above, the route generator 512 generates a route such that the autonomous mobile body 1 arrives at the location within the allowable arrival time period from $e^1_i$ to $l^1_i$. When two or more allowable arrival time periods can be assigned, the route generator 512 generates a route such that one of the allowable arrival time periods is satisfied. That is, the route is generated so that the following condition is satisfied.

$$e_i^1 \leq \rho_i \leq l_i^1 \text{ or } e_i^2 \leq \rho_i \leq l_i^2 \text{ or } \ldots \text{ or } e_i^{Li} \leq \rho_i \leq l_i^{Li}, \forall i \in N^-$$

In a case where two or more tasks with different specifics, such as loading and unloading of a plurality of loads, are assigned to the location, the generated route is adapted such that the required time periods for the two or more tasks do not overlap with each other at the location. Note that, as will be described later, at the time of inputting two or more tasks to one node, the required time periods may overlap with each other because calculation is performed so that the finally generated route prevents the required time periods from overlapping with each other.

Specifically, a travel time of the autonomous mobile body 1 between nodes, i.e., between locations is set to a value obtained by dividing a distance between the locations, which is defined as an edge, by an upper limit speed along the edge. When a task start hour and a required time period for the i-th autonomous mobile body 1 are defined as pi and T(wait,i), respectively, and a task start hour and a required time period for the j-th autonomous mobile body 1 are defined as pj and T(wait,j), respectively, a route is generated so as to satisfy the following condition.

$$\rho_i + T_{wait,i} \leq \rho_j \text{ or } \rho_j + T_{wait,j} \leq \rho_i, \forall i,j \in N^+ \cup N^-, x_i = x_j$$

Figure 9:
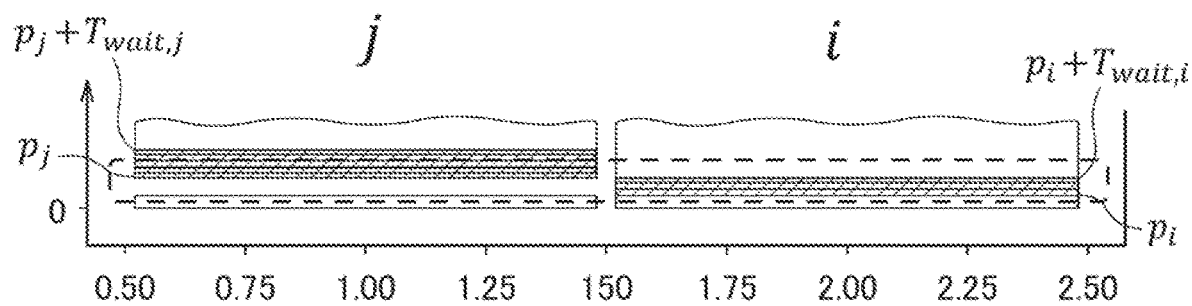
FIG. 9 is a diagram corresponding to a case where two autonomous mobile bodies perform tasks at a predetermined location, and illustrates that a task start hour and a standby time period during the task for one of the autonomous mobile bodies do not overlap with those of the other, as determined by a route generation device for an autonomous mobile body according to an embodiment of the present invention.

FIG. 9 illustrates a result achieved by satisfying the above condition. In FIG. 9, the hatched portions represent scheduled periods corresponding to the required time periods during which the i-th autonomous mobile body 1 and the j-th autonomous mobile body 1 perform their tasks. Referring to the area surrounded by the broken line, the required time periods do not overlap temporally with each other in terms of the vertical axis representing the time axis. This means that the route is adapted such that the required time periods for the i-th autonomous mobile body 1 and the j-th autonomous mobile body 1 to perform their tasks do not overlap with each other at the location.

The generated route is adapted such that a maximum possible quantity of tasks with different specifics, such as loading, unloading, etc., can be performed at a plurality of location. On the other hand, the route is generated such that the number of loads to be loaded on the autonomous mobile body 1 is as small as possible. The travel controller 511 controls and causes the autonomous mobile body 1 to travel along the generated route.

Figure 10:
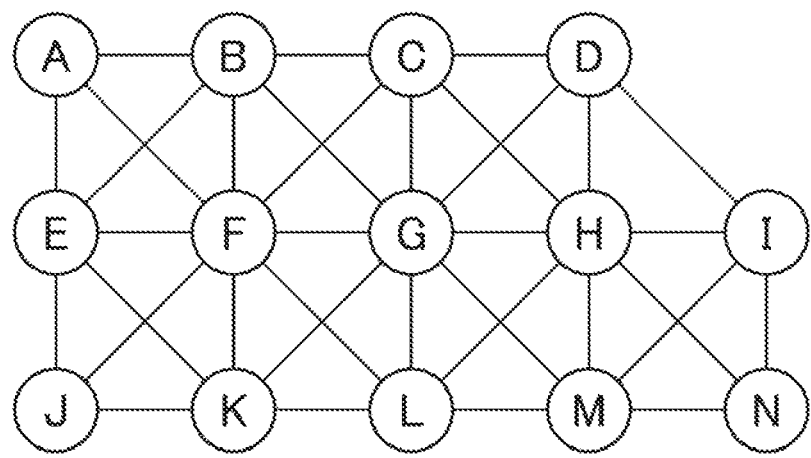
FIG. 10 is a diagram illustrating locations at which an autonomous mobile body performs tasks and routes connecting the locations, as determined by a route generation device according to an embodiment of the present invention.

By referring to FIG. 10, a more specific example will be described in which loading and unloading are performed at locations B, E, G, and I among locations A to N.

TABLE 1

| task number | transporting loads | loading location | allowable loading period | unloading location | allowable unloading period |
|---|---|---|---|---|---|
| 1 | iron material•1 | B | 9:00-10:00 | G | 9:45-10:30 |
| 2 | wood material•1 | E | 9:00-9:15 | I | 9:30-11:00 |

As shown in Table 1, one iron material of task number 1 is to be loaded at the location B, while one wood material of task number 2 is to be loaded at the location E. The one iron material of task number 1 is to be unloaded at the location G, while the one wood material of task number 2 is to be unloaded at the location I. In this way, for each task, the type and number of loads, the name of a location where loading is to be performed, the name of a location where unloading is to be performed, and an allowable task time period (an allowable loading period in which the loading is allowed and an allowable unloading period in which the unloading is allowed) are input as one set. This way of input allows for an increase in the number of tasks, and enable a plurality of autonomous mobile bodies 1 to share a task of transporting loads. For the sake of convenience, the following description is based on an assumption that in FIG. 10, a travel time along a vertical line between the location A and B and a travel time along a horizontal line between the locations A and E are each 5 minutes, and a travel time along a diagonal line (oblique line) between the locations A and F is 10 minutes. Further, a time required for loading at one location is assumed to be 1 minute, and a time required for unloading at one location is assumed to be 2 minutes. The departure point is set at the location A.

According to a shortest route starting from the location A, loading of task number 2 should be performed at the location E, loading of task number 1 should be performed at the location B, unloading of task number 1 should be performed at the location G, and unloading of the task number 2 should be performed at the location I via the location H.

However, as shown in Table 1, the "allowable loading period" and the "allowable unloading period", which are specific examples of the "allowable arrival time period" described above are set at each location. Accordingly, in order for the autonomous mobile body 1 to arrive at the locations within these scheduled periods, a route is generated as follows. Departure from the location A at 9:00. Arrival at the location E at 9:05, Loading of task number 2, Departure from the location E at 9:06

Arrival at the location B at 9:16, Loading of task number 1,

Departure from the location B at 9:17

(Via the locations C and D)

Arrival at the location I at 9:37, Unloading of task number 2,

Departure from the location I at 9:39

(Via the location H)

Arrival at the location G at 9:49, Unloading of task number 1,

Departure from the location G at 9:51

The present embodiment achieves the following effects. The present embodiment includes the controller 50 that generates, in response to acceptance of an allowable arrival time period assigned to at least one of a plurality of locations as destinations, an input of information regarding the specifics of a task to be performed at the at least one location, and setting of a required time period according to the specifics of the task, a route that allows the autonomous mobile body to arrive at the at least one location as the destination within the allowable arrival time period, based on the required time period. The controller 50 controls and causes the autonomous mobile body 1 to travel along the generated route. This feature further makes it possible to generate a route in consideration of the allowable arrival time period, the specifics of the task, and the required time period, under conditions that the autonomous mobile body 1 has a limited battery capacity and a limited pay load. This feature makes it possible for the autonomous mobile body 1 to arrive at a predetermine location within a limited scheduled period and to perform a task, and enables generation of a route that allows the autonomous mobile body 1 to perform a task more safely.

According to the present embodiment, a plurality of the allowable arrival time periods can be assigned to one of the plurality of locations, and the controller 50 generates a route such that one of the plurality of the allowable arrival time periods is satisfied. This feature makes it possible for the autonomous mobile body 1 to perform a task without incurring unnecessary waiting time at the location.

According to the present embodiment, the required time period is set for each type of task. This feature makes it possible to set different required time periods for different types of tasks one of which takes a certain time and another of which takes little time. Thus, an appropriate required time period can be set for each task.

According to the present embodiment, the required time period is set to a value obtained by multiplying at least one of the type or the number of loads to be loaded on the autonomous mobile body 1. This feature makes it possible to set a required time period in consideration of the type and/or the number of the load, thereby enabling generation of a more appropriate route.

According to the present embodiment, a plurality of tasks with different specifics are assigned to one of the plurality of locations as the destinations, and the controller 50 generates a route such that the required time periods do not overlap with each other at the one of the plurality of locations. This feature makes it possible to avoid a situation in which a plurality of autonomous mobile bodies 1 arrive at a location at the same time and one or more of the plurality of autonomous mobile bodies 1 are put on standby while being prevented from performing the tasks.

According to the present embodiment, the controller 50 generates a route such that a maximum possible quantity of tasks with different specifics assigned to the plurality of locations as the destinations are performed. This makes it possible for the tasks to be performed with improved efficiency.

According to the present embodiment, the controller 50 generates a route such that a small number of loads are loaded on the autonomous mobile body 1. Due to this feature, the load on the autonomous mobile body 1 can be reduced, thereby making it possible to improve consumption efficiency of the battery that supplies electric power for driving the wheels of the autonomous mobile body 1 while the autonomous mobile body 1 is traveling. Further, in the present embodiment, the controller 50 generates a route such that a plurality of autonomous mobile bodies 1 share the task. This feature makes it possible to avoid a situation in which at one location as a destination, a time period during which one of the plurality of autonomous mobile bodies 1 performs its task overlaps with a time period during which another of plurality of autonomous mobile bodies 1 performs its task, thereby enabling the tasks to be performed with high efficiency.

The present invention is not limited to the above embodiment, and various design changes can be made without departing from the spirit of the present invention. For example, the configuration of the autonomous mobile body 1 according to the above embodiment is a non-limiting example. In the above embodiment, the autonomous mobile body is for transporting a load from one location to another while autonomously traveling along a road without a driver aboard, and performing loading and unloading, in a limited outdoor work area including a semi-outdoor area, such as a construction site. However, this is a non-limiting example. For example, it is possible to input, as the tasks, maintenance tasks that are preferable to perform at least once per day for the autonomous mobile body, specific examples of which include replacement of a battery in the case of an autonomous mobile body equipped with a detachable battery, supply of fuel such as gasoline in the case of an autonomous mobile body that travels with an internal combustion engine, air pressure check of tires, and check of contamination of sensors.

Furthermore, in the embodiment above, the route is generated such that a maximum possible quantity of tasks with different specifics assigned to the plurality of locations as the destinations are performed. However, this is a non-limiting example. For example, it is possible to generate a route such that an essential condition that the autonomous mobile body 1 is not overloaded with weight or the battery level is equal to or higher than a predetermined level is satisfied.

EXPLANATION OF REFERENCE NUMERALS

1: Autonomous mobile body
50: Controller
pi: Task start hour
T(wait,i): Required time period

What is claimed is:

1. A route generation device for an autonomous mobile body capable of autonomously moving to a plurality of destinations, the route generation device comprising:
   a controller configured to generate, in response to acceptance of an allowable arrival time period assigned to at least one of the plurality of destinations, an input of information regarding specifics of a task to be performed at the at least one destination, and setting of a required time period according to the specifics of the task, a route that allows the autonomous mobile body to arrive at the at least one destination within the allowable arrival time period, based on the required time period,
   the controller being configured to control and cause the autonomous mobile body to travel along the generated route.

2. The route generation device according to claim 1, wherein
   a plurality of the allowable arrival time periods are able to be assigned to one of the plurality of destinations, and
   the controller generates a route such that one of the plurality of the allowable arrival time periods is satisfied.

3. The route generation device according to claim 1, wherein
   the required time period is set for each type of task.

4. The route generation device according to claim 1, wherein
   the required time period is set to a value obtained by multiplying at least one of a type or a number of a load to be loaded on the autonomous mobile body.

5. The route generation device according to claim 1, wherein
   a plurality of the tasks with different specifics are assigned to one of the plurality of destinations, and
   the controller generates a route such that the required time periods do not overlap with each other at the one of the plurality of destinations.

6. The route generation device according to claim 1, wherein
   the controller generates a route such that a maximum possible quantity of tasks with different specifics assigned to the plurality of destinations are performed.

7. The route generation device according to claim 1, wherein
   the controller generates a route such that a small number of loads are loaded on the autonomous mobile body.

8. The route generation device according to claim 1, wherein
   the controller generates a route such that a plurality of the autonomous mobile bodies share the task.

* * * * *